United States Patent [19]

Rhoades

[11] Patent Number: 5,114,548
[45] Date of Patent: May 19, 1992

[54] ORBITAL ELECTROCHEMICAL MACHINING

[75] Inventor: Lawrence J. Rhoades, Pittsburgh, Pa.

[73] Assignee: Extrude Hone Corporation, Irwin, Pa.

[21] Appl. No.: 564,604

[22] Filed: Aug. 9, 1990

[51] Int. Cl.$^5$ .................. B23H 3/00; B23H 5/06; B23H 5/14; B23H 7/28
[52] U.S. Cl. ........................ 204/129.46; 204/129.7
[58] Field of Search .......... 204/129.46, 222, 224 M, 204/225, 129.7

[56] References Cited

U.S. PATENT DOCUMENTS

| | | | |
|---|---|---|---|
| 2,997,437 | 8/1961 | Whitaker | 204/222 X |
| 3,103,482 | 9/1963 | Graham | 204/129.46 X |
| 3,564,190 | 2/1971 | Kandajan et al. | 219/69 |
| 3,593,410 | 7/1971 | Taylor | 29/557 |
| 3,663,786 | 5/1972 | O'Connor | 219/69 V |
| 4,206,028 | 6/1980 | Inoue | 204/224 M |
| 4,294,673 | 10/1981 | Kimoto et al. | 204/129.46 |
| 4,839,005 | 6/1989 | Katsumoto et al. | 204/129.46 |

Primary Examiner—Donald R. Valentine
Attorney, Agent, or Firm—Waldron & Associates

[57] ABSTRACT

A method for electrochemical machining a workpiece utilizing an electrolyte that is passivating to the workpiece, wherein the conductive tool is provided with a nonconductive abrasive surface, and said tool and workpiece are brought together with a contacting relative motion so that said abrasive surface will selectively abrade the workpiece to remove any passivation layer therefrom in those areas to be machined and such that the unabraded surface areas will retain the passivation layer to prevent electrochemical machining thereof, and a reciprocally motion between the tool and workpiece is also effected to pump the electrolyte through the gap between the tool and workpiece and prevent it from becoming over-heated.

40 Claims, 5 Drawing Sheets

ORBITAL ELECTROCHEMICAL MACHINING

BACKGROUND OF THE INVENTION

1. Field of the Invention

This invention relates generally to a new and unique electrochemical machining process, and more specifically to a unique electrochemical machining process which has greatly improved shaping capabilities over comparable prior art techniques by including a relative contacting movement, orbital or otherwise, between the tool and workpiece in one plane, and further effecting a reciprocating motion as a result of the orbital motion or by a separate reciprocal motion in a second plane. This new and inventive process greatly expands the capabilities of electrochemical machining to make possible the electrochemical machining of complex external or internal shapes with a high degree of accuracy and precision not obtainable by prior art electrochemical machining practices. Of particular significance is the fact that the process of this invention provides a relatively simple method of machining such complex shapes as turbine blades with a high degree of accuracy, either individually, or even a whole circle of turbine blades on a complex turbine wheel simultaneously.

2. The Prior art

Electrochemical machining (ECM), is one of the non-traditional machining processes, which is in essence an application of Faraday's Law in a machining process to selectively and controllably remove metal from a workpiece. While the most familiar application of Faraday's Law is in electroplating, where metal is deposited onto a workpiece surface, ECM can be thought of as the reverse of metal plating where metal is removed electrochemically from the workpiece. Because metal removal is electrochemical rather than mechanical or thermal, ECM is ideally suited to the machining of metals which are difficult to machine by the more traditional machining processes, and will not induce any residual stresses or distortion in the machined workpiece. Even heat treated and work hardened metals can be machined by ECM without any adverse affects on the metal's pre-machining properties.

Unlike conventional machining, the ECM tool does not contact the workpiece, and accordingly, removes metal from a workpiece electrochemically atom by atom with virtually no tool wear. In this process, an electrically conductive working tool and the electrically conductive workpiece are each secured to a DC power supply, with the tool as cathode and the workpiece as anode, while a suitable electrolyte is circulated through a narrow gap maintained between the tool and workpiece. Utilizing proper operating parameters during the machining process, the workpiece is "deplated" in that area directly opposed from the cathodic tool, such that metal is selectively removed from the workpiece surface to form a negative, conjugate image of the tool face, but with some degree of anticipated variation. That is to say, because of process variables, such as electrolyte flow patterns and variables in conductivity across the gap, the electrochemically machined face, particularly in complex surface configurations, will normally be somewhat different from the face on the electrode tool. Since the result is not always predictable, a trial and error approach is often utilized to develop a tool shape as necessary to achieve the desired machined shape.

ECM has a relatively high metal removal rate, e.g. one cubic inch of metal can be removed per minute at 10,000 amperes at 1000 amperes per square inch current density. Generally, the current density is the primary factor in establishing removal rate and smoothness of the machined surface, with higher current densities creating higher removal rates and better surface finishes. In machining to any significant depth, either the tool or the workpiece must be made to progressively move toward the other for the purpose of maintaining a constant interface gap as necessary for optimum operation.

The metal atoms removed from the anodic workpiece surface by the electrochemical action normally combine with a hydroxyl radical in the electrolyte, thereby freeing hydrogen ions, both of which are carried away by the circulating electrolyte to thereby maintain high removal rates and reasonably close machining tolerances. At the cathodic tool, the electrons flowing from the anode combine with hydrogen ions forming hydrogen gas, which is also carried away by the circulated electrolyte.

There is considerable heat evolved in electrochemical machining in direct proportion to the current density. It is essential therefore, particularly at high removal rates, that a constant and uniform electrolyte flow be maintained and assured through the gap to prevent boiling of the electrolyte. Indeed, any pockets of electrolyte which do not flow readily may cause the electrolyte to boil in those locations creating vapor bubbles which will cause arcing and could virtually ruin the intended results. In order to keep the electrolyte machining characteristics constant, the electrolyte temperature, pH value and chemical concentration must be regulated during operation of the process. Accordingly, the machining apparatus is usually provided with an electrolyte treating system to adequately cool the electrolyte, vent the hydrogen, remove the metal hydroxide sludge therefrom, and if necessary, readjust the electrolyte pH.

The most common electrolyte used in ECM is an aqueous salt solution, normally, sodium chloride or sodium nitrate. Sodium chloride has been an ideal electrolyte because its chemical composition is not depleted by the ECM process since neither the sodium nor chlorine ions enter into the occurring reactions. In addition, sodium chloride has good electrical conductivity, is readily available, inexpensive, nontoxic and has a low tendency to passivate the workpiece. Other electrolytes such as sodium nitrate, for example, have a number of desirable characteristics, such as a low factor for causing stray etching. Many of such other electrolytes, however, can have a tendency to passivate the workpiece surface. "Passivation" of the workpiece surface is a condition whereby the electrolyte forms a nonconductive complex oxide film on the workpiece surface, which, by virtue of its nonconductivity, will electrically insulate the workpiece surface to prevent the desired electrochemical metal removal from progressing. For conventional ECM processes, therefore, it is essential that the electrolyte not be one that will passivate the workpiece surface to an extent sufficient to interfere with the desired machining operation.

Even though the above brief description is rather simplistic in describing the basic ECM process, space does not permit even a brief description of all the applications to which ECM has been applied with some degree of variation to the above description. Examples of such variations include: electrochemical deburring, electrochemical grinding, electrochemical discharge grinding, electrochemical honing, electrochemical polishing and others.

Of all the above noted modifications to conventional electrochemical machining, electrochemical grinding is the most pertinent to this inventive process, and involves metal removal by both an electrochemical action and a physical grinding action. In electrochemical grinding, a unique rotating grinding wheel is utilized which has a conductive interior body with nonconductive abrasive particles on the grinding surface protruding from the conductive body. Accordingly, the rotating grinding wheel not only functions to remove metal by a conventional grinding action of the protruding abrasive particles, but the conductive interior body further serves as the cathode in the electrochemical metal removing action. The nonconductive abrasive particles extending from the conductive body portion further serve to space the conductive body of the wheel from the conductive surface of the workpiece, and thereby maintain a constant gap between the tool and the workpiece as necessary to maintain an optimum electrochemical deplating action. In some applications, the grinding wheel is also of sufficient porosity that the electrolyte, necessary for the electrochemical reaction, is conveyed by centrifugal force to the grinding surface from an annular chamber at the axis of the grinding wheel. In other applications, particularly those where the physical grinding is affected by the side surface of the grinding wheel, the electrolyte is passed through an external conduit and directed to the gap between the wheel's conductive body and the workpiece. In either situation, the electrolyte is continuously drawn through the gap by the rotating particulate surface of the grinding wheel so that overheating of the electrolyte is never a problem.

The benefits derived from electrochemical grinding stem primarily from the fact that it utilizes the combined effect of ECM and conventional physical grinding with the added advantage that by merely biasing the grinding wheel against the workpiece surface, the proper gap can be maintained.

In typical applications of electrochemical grinding, a majority of the metal removal, i.e. 70 percent or more, is removed by the electrochemical reaction, while the smaller balance is removed physically by the abrasive action of the grinding wheel. Accordingly, wheel pressure on the workpiece surface is usually low so that physical wear is minimized and the need for wheel dressing is also minimized. The fact that the grinding wheel will remove surface films during the grinding operation, adds another advantage in permitting a greater choice of electrolytes. That is to say, because the mechanical grinding action of the grinding wheel will prevent the formation of surface films on the workpiece surface during the grinding operation, there is no need to be concerned about passivation of the electrolyte, and hence electrolytes can be utilized even if they would otherwise have a propensity to passivate the workpiece.

While all of the above noted ECM process variations, including electrochemical grinding, have been successful in advancing the ECM art, all have their advantages, disadvantages and limitations. Electrochemical grinding, for example, is utilized solely in face, plunge, cone or contour grinding as it is only capable of grinding surfaces that can be generated by wheel rotation, just as in conventional grinding. Because of stray etching and undercutting, it is only with great difficulty that ECM in any form is capable of machining complex three-dimensional configurations with any significant degree of precision or resolution of intricate detail.

Orbital abrading, on the other hand, is another non-traditional machining process which is entirely different and distinct from ECM. Orbital abrading involves the physical abrasion of a workpiece by a tool having an abrasive surface. Unlike conventional grinding, orbital abrading does not utilize a rotating grinding wheel, but rather brings the tool and workpiece together, whereby at least one of which is in orbital motion with respect to the other. In this process, the working tool is usually formed of a comparatively much harder material than the workpiece, and typically has a three-dimensional configuration in its working face. By orbiting either the tool or the workpiece, or both, while the tool and workpiece are in contact and biased against each other, and using a very small radius of orbit, the complementary negative configuration of the tool is worked into the workpiece. Unlike conventional grinding techniques, orbital abrading utilizes a very small relative movement, having a radius of orbit, typically from 0.020 to 0.100-inch at a typical rate, of 1200 oscillations per minute. Because of the orbital motion between the tool and the workpiece, the resulting machined configuration in the workpiece cannot be of identical size to that of the tool. However, because of the very small orbital displacement of the two pieces during working, the difference in size is small, and further permits the production of rather detailed and intricate ground configurations with a high degree of resolution, in either two or three dimensional form.

While orbital abrading is a well accepted non-traditional machining process based solely on its own merits, there are other known machining processes wherein orbital abrading, or at least orbital motion between the tool and workpiece, has been combined with other machining techniques. For example, U.S. Pat. No. 3,593,410, issued to Taylor, teaches a machining process which utilizes a vibratory motion between an abrasive tool and workpiece wherein the interface is submerged in a solution which will chemically alter the workpiece surface to facilitate the mechanical abrasion. U.S. Pat. No. 3,663,786, issued to O'Connor, teaches an electrical discharge machine tool which provides an abrasive relative motion between the electrode and workpiece, primarily for the purpose of machining graphite electrical discharge machining electrodes. Of more relevance to this invention, U.S. Pat. No. 3,564,190, issued to Kandajan et al. teaches a number of machining processes including an electrochemical machining process wherein a relative motion, orbital or otherwise, is imparted between the tool and workpiece, so that the workpiece is machined by the combined activity of the two processes. This reference does not, however, teach or suggest the unique features of this invention as essential to effect a greater degree of precision, but rather, relies merely on the combined metal removal techniques to speed the machining process.

SUMMARY OF THE INVENTION

This invention is predicated on the development of a new and unique method of electrochemical machining which does have the capability of machining complex two and three dimensional configurations with a high degree of accuracy, precision and resolution of intricate detail. In this unique new electrochemical machining (ECM) process, the tool is similar to the tool used in ECM grinding, in that it has an electrically conductive body with non-conductive abrasive particles at the surface such that the particles will provide a preset gap distance between the conductive body of the tool and the conductive workpiece. In this process, however, the tool is not a rotating tool, and can therefore have any surface configuration desired to be machined into the workpiece, including three dimensional configurations. In the new ECM process of this invention, the tool and workpiece are brought together under ECM processing conditions with a relative motion between the two components, while at the same time, the surface areas of contact reciprocate through a cycle whereby they are in contacting motion for a moment of time, then move away from each other and then back into contacting motion to essentially "pump" the electrolyte through the interfaces. Depending upon the geometry of the interfaces, the relative motion alone can effect the reciprocating pumping action, or if needed, a second relative motion in a different plane can be imposed to effect the reciprocating relative motion. While the contacting motion will normally be a circular orbital motion, it can be any two dimensional reciprocating movement describable by a point on the moving component moving in a closed trajectory line in a plane transverse to that of the feed axis, and may define many forms such as circular, oval, elliptical, polygonal and other forms, including combinations thereof, as may be essential to achieve the machining desired. The reciprocating relative motion between the contacting interfaces will cause heated electrolyte to be purged from the interface while drawing in fresh cooled electrolyte with each cycle of reciprocation motion. As in more conventional applications, the tool and/or workpiece may have to be made to progressively advance one toward the other at a feed rate in proportion to the metal removal rate to maintain a preferred gap spacing between the tool and workpiece as the metal is being removed.

The electrolyte used in this inventive process must be very strongly passivating to the workpiece, which serves to provide both a macro and micro controllability to the inventive process, as described herein below.

Like conventional electrochemical grinding tools, the tool utilized in this inventive process must be provided with non-conductive abrasive particles extending from a conductive body portion by a distance which should be equal to or less than the desired gap for good electrochemical machining. During the process, the non-conductive abrasive particles extending from the tool surface must be in contact against the surface of the workpiece sufficient only to lightly abrade the workpiece surface in a manner akin to orbital machining, but serving only to abrade away the passivation layer. At the same time, and/or a fractional second thereafter, the conductive body portion of the tool, as a cathode, properly spaced from the workpiece, will electrochemically machine the workpiece surface. Unlike conventional electrochemical grinding, where the physical abrasion accounts for 10 to 30 percent of the metal removal, the physical abrasion caused by the orbital action between the tool and workpiece in this invention does not significantly contribute to the machining of the workpiece, but is sufficient only to abrade away the passivation layer, as above noted. This rather limited abrasive action will, however, provide numerous unexpected advantages which will add a considerable measure of control to the electrochemical metal removing action, and enhance the capabilities of the process to greatly improve precision and resolution of detail.

In accordance with the basic application of this invention, the machining is achieved almost entirely by the electrochemical action. The electrolyte and operating parameters are normally selected so that the electrolyte is very strongly passivating to the workpiece, particularly at the finish of the machining operation to achieve a greater degree of precision. The orbital abrading action of the tool surface serves merely to lightly abrade the surface of the workpiece, sufficient only to remove or prevent the formation of the passivation layer in those selected areas where the tool abrades the workpiece. The passivating nature of the electrolyte serves not only to prevent the electrochemical machining action on those surfaces where the tool, by design, does not abrade away the passivation layer, but further serves, in combination with proper tool design and motion thereof, to control the metal removal on those surfaces where the tool does remove the passivation layer. Accordingly, the electrochemical machining will progress only on those areas where the tool has removed, or prevented the formation of, the passivation layer, and then only to the extent as determined by the tool design and motion thereof. The tool geometry, nature of the abrasive surface thereon and its motion relative to the workpiece, can be utilized to very carefully define those areas where the electrochemical machining is to be effected and the degree of electrochemical machining on those various surfaces, to thereby control and regulate the overall electrochemical machining process to a far greater degree than had been capable by prior art practices.

In addition to the above advantages of this invention, numerous other unexpected advantages are afforded by this inventive process. For example, the process of this invention will tend to significantly minimize overcut because only those surfaces abraded by the tool will be electrochemically machined. In addition, because there is no need to adjust conditions for preventing passivation, there is a wider choice of electrolytes and accordingly electrolytes can be used which will minimize stray etching. Still another beneficial factor is that the process of this invention can be performed at exceptionally high current densities to achieve high removal rates and improve surface finish without the normal ill effects of high current densities, i.e. stray etching and undercutting. Specifically, stray etching and undercutting are prevented from occurring in the process of this invention by an intentionally formed passivation layer, so that very sharp external corners can be formed even at high current densities. That is to say, because current densities are always higher at points and sharp corners, it is difficult to machine sharp external corners by conventional ECM, especially at high current densities, as stray etching will erode at least a portion of the workpiece surface around the corner from the electrode, thereby tending to "round" the corner. Sharp external corners can readily be machined by the process of this invention, however, by utilizing proper tool design which will permit quick passivation on one surface while machining an adjacent surface to effect a sharp corner as desired. In view of these and other considerations, this new and unique process for electrochemical machining will provide a significantly greater degree of control of the overall machining action to produce a much greater degree of accuracy and precision in both simple and complex surfaces and images than has been possible with any prior art electrochemical machining process.

In addition to the above considerations, the process of this invention finds particular utility in the machining of very complex forms such as turbine blades and the like, not only individually, but also in groups, including the simultaneous machining of all turbine blades on a turbine wheel.

While most of the earlier turbine wheels were manufactured of many component parts, with each turbine blade individually keyed to the turbine wheel, more recent developments have been addressed to reducing the weight of the turbine wheel by designing the wheel with the turbine blades thereon in one part to eliminate the excess weight necessitated by the mass of metal needed to effect the key-in attachments. While this approach has proven very effective in reducing the weight of turbine wheels and greatly increasing their efficiency, the machining of such one-piece turbine wheels has proven to be extremely difficult. The unique process of this invention, as noted above, will permit a relatively simple method of machining such turbine wheels to a very high degree of accuracy, in a relatively short time at a significant cost savings.

OBJECTS OF THE INVENTION

Accordingly, it is an object of this invention to provide a new and improved method for electrochemical machining which will provide a significantly greater degree of control of the machining action to effect a greater degree of accuracy and precision in both simple and complex surface and images than has been possible with prior art electrochemical machining processes.

It is another object of this invention to provide a new and improved method for electrochemical machining that utilizes a strongly passivating electrolyte and incorporates a light oscillating or orbital abrading action by the tool to selectively and controllably remove the passivation layer and thereby selectively control the electrochemical machining action.

It is a further object of this invention to provide a new and improved method for electrochemical machining which utilizes a reciprocal motion between the tool and workpiece to pump and enhance the circulation of the electrolyte through the interface to thereby permit the use of higher current densities to improve the quality of the finished product without the risk of overheating the electrolyte.

It is still another object of this invention to provide a new and improved method for electrochemical machining which permits a wider selection of electrolytes and thus permits the use of those electrolytes that will minimize stray etching.

It is an even further object of this invention to provide a new and improved method for electrochemical machining which eliminates or minimizes overcutting.

It is another object of this invention to provide a process machining complex shapes such as turbine blades, either individually or in groups, including the simultaneous machining of all turbine blades on a one piece turbine wheel.

DETAILED DESCRIPTION OF THE INVENTION

Throughout the description of the invention, the term "relative" contacting motion or "relative" orbital motion or movement between the contacting surfaces of the workpiece and tool is used to indicate that either or both the workpiece and tool may be in motion to effect a working of the workpiece, with the tool lightly abrading the surface of the workpiece. The actual relative contacting motion at the interface between the workpiece and tool, however, may or may not be orbital, depending on the geometry of the workpiece surface. In addition to the essential "relative" contacting motion, there must also be a relative reciprocating motion where at least portions of the contacting interfaces between the tool and workpiece oscillation to move into contact and away from contact, for purposes of pumping the electrolyte. Here again relative reciprocating motion is meant to indicate that either or both the workpiece and tool may be in motion to effect a resultant reciprocating movement which may be a specific reciprocating movement in addition to the relative contacting motion in a different plane, or it may be a natural resultant reciprocating motion at the contacting interface created by a relative contacting orbital motion.

In addition to the above noted motion or motions, whether effected by a single contacting orbital motion or the combination of a contacting relative motion and a reciprocating motion, a feeding or advancing motion may have to be included for the purpose of maintaining the desired contacting interfaces as the surface of the workpiece is machined away by the ECM reaction. If the tool only works one surface of the workpiece, this "advancing" motion will have to be a linear motion whereby the workpiece and tool are slowly brought together so that each orbital contact between the tool and workpiece will be uniform despite the fact that the workpiece surface is being machined away. If the tool orbits around an exterior or interior surface of the workpiece machining the circumference thereof, the "advancing" motion will have to be represented by a slow change in the radius of orbit to maintain the constant contact between tool and workpiece as the circumference of the workpiece is machined away.

Figure 1:
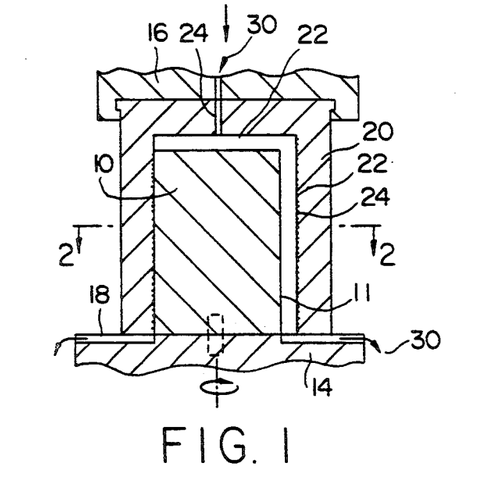
FIG. 1 is a schematic cross-sectional elevational view illustrating a very simple embodiment of this invention utilizing only a simple orbital relative motion to machine a simple cylindrical workpiece.
Figure 2:
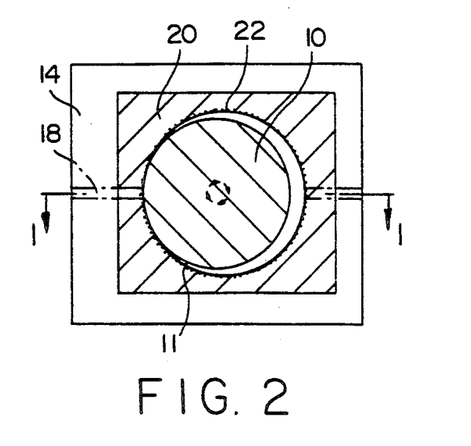
FIG. 2 is a schematic cross-sectional plan view of the embodiment illustrated in FIG. 1

Reference to FIGS. 1 and 2 will illustrate a very simple embodiment of this invention which, in addition to a feeding motion, utilizes only an orbital contacting motion between the workpiece and tool. In this application, FIG. 1 shows a schematic cross-sectional elevation illustrating a cylindrical workpiece 10 and tool 20 as engaged during the machining operation, while FIG. 2 shows a schematic cross-sectional plan view of the embodiment shown in FIG. 1. In the embodiment illustrated, the conductive metal workpiece 10, having a cylindrical surface configuration to be machined, is secured onto an orbital table 14, with the axis of cylindrical workpiece 10 vertically disposed, and which moves the workpiece 10 in a circular, orbitally oscillating relationship with the motion being limited to the horizontal plane. It should be appreciated that the relative motion is orbital and not rotational. As in conventional ECM, the tool and workpiece must be conductively connected to a DC power supply (not shown) with the tool 20 as cathode and the workpiece 10 as anode.

Tool 20, secured to platten 16, should be fabricated of a conductive material such as copper, having a cylindrical opening 22 therethrough, the walls of which serves as the working surface. The cylindrical working surface of opening 22 is provided with a uniform layer of a nonconductive abrasive particles 24 bonded to the conductive material. Techniques for bonding the nonconductive abrasive particles to the conductive body are well known in conventional electrochemical grinding, and need not be detailed here. The particle size of the abrasive 24 on the cylindrical surface of tool 20 should be relatively small, i.e. smaller than about 70 mesh, and ideally about 320 mesh. The surface density of the abrasive grit 22 should be reasonably high in comparison to conventional orbital grinding, to assure that the passivation layer is completely removed during the short period of contact between the tool and workpiece.

During the processing, the relative orbital contacting motion as described, must be sufficient to cause the workpiece 10 to orbit about within tool 20, or vice versa, such that the abrasive particles 24 will lightly abrade the cylindrical surface 11 of workpiece 10 with the area of contact continually changing, i.e. moving radially around both cylindrical surfaces 11 and 22. Specifically, at any given point in time, the area of contact will be a line, or very narrow band extending the full height of cylindrical surface 11 where the working face 22 is tangent thereto, as depicted at the left side of workpiece 10 in FIGS. 1 and 2. As the orbit progresses, the line or band of contact will revolve around surface 11, so that one full orbital revolution will cause the entire cylindrical surface 11 to be contacted by surface 22, and accordingly abraded.

During the processing, a suitable electrolyte 30 is admitted into the chamber between workpiece 10 and tool 20 via inlets 24, so that the electrolyte will move downwardly through the chamber and exit through the gap between tool 20 and orbital table 14, where it is recovered and reprocessed by any suitable means (not shown). Such electrolyte processing and recirculation systems are well known in the prior art and need not be further described here. As shown in FIGS. 1 and 2, channels 18 can be provided within the upper surface of table 14 to facilitate the flow of electrolyte from between the workpiece 10 and tool 20.

The electrolyte 30, as noted, may be strongly passivating to the workpiece, so that the workpiece surfaces are quickly passivated to prevent and electrochemical machining thereof, were it not for the mechanical abrading action which prevents the build-up of any passivation layer. As the abrasive particles abrade away a thin surface layer, including any formed oxides, to expose fresh non-oxidized workpiece metal, as a result of the motion of the contacting interface, the ECM reaction will cause metal to be removed at that site. The continued relative motion will cause the abrasive particles to move away from the freshly abraded surface, so that the electrochemically machining thereof will continue, at least for a short period of time before the tool and workpiece are spaced too far apart to effect the electrochemical reaction. This action will progress around the cylindrical surface of workpiece 10 behind the constantly moving area of direct contact. In view of the fact that a flow of the electrolyte is caused by virtue of its being directed downwardly through the chamber between workpiece 10 and tool 20, the electrolyte is caused to flow through the gap between the tool and workpiece pursuant to conventional ECM practices. One of the unique features of this invention, however, is the fact that the workpiece and tool are caused to have a relative reciprocal motion so that the electrolyte is further caused to be effectively "pumped" through the contacting gap between the tool and workpiece. It should be apparent therefore, that because of this added pumping action, there will be no pockets of electrolyte which can be trapped between the workpiece and tool surfaces which can become over-heated to adversely effect the processing. As a result, significantly higher current densities can be utilized in the ECM processing, which will provide a higher metal removal rate and a smoother and more uniform finish to the ECM machined surface.

In the above described embodiment, it should be noted that the flat upper surface 13 on workpiece 10 is not contacted or abraded by tool 20. Accordingly, this flat surface 13 will be very quickly passivated by electrolyte 30 so that virtually no portion thereof will be machined by either physical abrasion or the ECM reaction. As previously described, only the intersecting cylindrical surface 11 is machined, and because of this machining of just the one intersecting surface, a very sharp intersecting right angle will be maintained between surfaces 11 and 13. Indeed, even very high current densities can be employed without any tendency for the ECM reaction to "round" or bevel away the sharp corner. While this is a rather simple example of this particular beneficial feature of this invention, it does serve to illustrate an example of the macro controls available with this process. Specifically, without passivation of surface 13, this surface would be machined to some extent by the ECM reaction even if the gap distance to the tool thereover were rather large. This is because some metal removal would result from stray etching caused by currents passing between the cylindrical surface 22 of tool 20 and the flat upper surface 13 on workpiece 10, which would be manifested by a rounding of the angle of intersection between surfaces 11 and 13.

The parameters for the contacting orbital motion should ideally be the same as that used in orbital grinding, as discussed above. The gap between the conductive body of tool 20 and workpiece 10 at their point of closest proximity will of course be equal to that distance the abrasive particles space the two components apart, and should be set to be the distance preferred for optimum electrochemical machineability, or slightly less, so that optimum electrochemical machining can be effected during the more prolonged period in the cycle while the tool 20 is spaced away from the workpiece 10. The maximum spacing between the tool 20 and workpiece 10 at their furthest apart position will be no more that the diameter of the orbit, i.e. typically no more than about 0.2 inch. As shown in FIGS. 1 and 2, however, that gap distance is exaggerated to facilitate an understanding of the figures.

Since the desired machining of the cylindrical surface of workpiece 10 will progressively reduce the radius thereof, the radius of the relative contacting orbital motion will have to be continuously increasing in order to effect an advancing motion so that the physical contact between the tool and workpiece will be maintained. The ability to effect this progressively increasing radius of orbit is available with appropriate commercial machine tool orbital tables through rather complicated linkage, which need not be described here. It is also within the skill of the art to be able to accurately calculate the machining rate and then preset the orbital table so that the radius of orbit will progressively increase as necessary to maintain the desired contact pressure between the tool and workpiece throughout the machining operation. As an alternative, and particularly towards the end of the machining action, it may be desirable in some situations to permit the contacting force between the tool and workpiece to be progressively increased so that the final machining action is limited primarily to a physical abrasion for the purpose of achieving a more precision finish.

In the above described embodiment, it can be seen that the relative contacting orbital motion will cause the tool to abrade the passivation layer from the surface of the workpiece, or prevent the formation of a passivation layer so that the surface can be machined by the electrochemical reaction between the conductive surface of the tool and workpiece immediately thereafter. During this entire operation, the tool is moving towards and then away from the workpiece, to effectively pump the electrolyte through the gap to prevent any portion thereof from becoming over-heated. In this particular application the single contacting orbital motion will effect both requirements. Any curved surface such as cylindrical, hemispherical and the like can usually be machined by such a technique whereby a simple contacting orbital motion will effect both the desired machining operation as well as the electrolyte pumping action.

Figure 3:
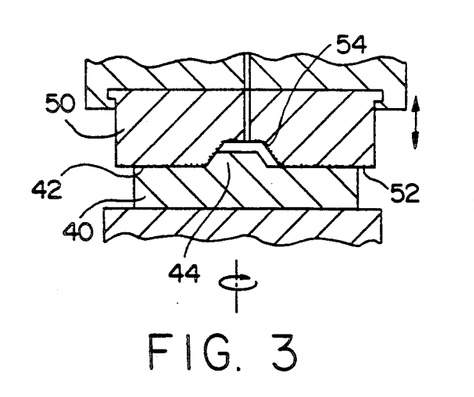
FIG. 3 is a schematic cross-sectional elevational view illustrating another very simple embodiment of this invention utilizing a combination of an orbital relative motion and a reciprocal relative motion to machine a flat surface on a workpiece, showing the tool and workpiece in contact.
Figure 4:
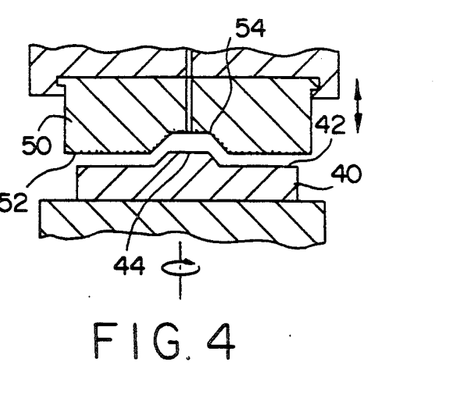
FIG. 4 is identical to FIG. 3 except that it shows the tool and workpiece in a non-contacting relationship.

Reference to FIGS. 3 and 4 will illustrate a rather different embodiment of this invention as may be utilized to abrade flat workpiece surfaces. In the case of such flat workpiece surfaces, a simple contacting orbital motion in the plane of the workpiece surface will not be sufficient to effect a reciprocating motion between the tool and workpiece as necessary to pump the electrolyte through the interface gap. In such an application, therefore, it will be necessary to impose a relative reciprocal motion as well as a contacting orbital motion.

As shown in FIGS. 3 and 4, a workpiece 40, having an annular-shaped upper surface 42 with a frusto-conical portion 44 extending upward from the center, is machined by tool 50. Tool 50 has a flat bottom surface 52 with a frusto-conical recess 54 therein for mating with frusto-conical portion 44. The flat bottom surface 52, as well as the surface within frusto-conical recess 54 are both covered with an abrasive grit, as previously described. The workpiece 40 and tool 50 are attached to an orbital table and platten respectively as well as a DC power source (not shown), as previously described, and placed in a relative contacting orbital motion as also previously described. In addition to the relative contacting orbital motion, a relative reciprocal motion is also effected between workpiece 40 and tool 50 so that these two components repeatedly move together and touch for a period of time sufficient to lightly abrade the workpiece surface, and then move away from each other. Accordingly, FIG. 3 illustrates that relative position during the cycle where the workpiece and tool are in contact, while FIG. 4 illustrates the relative position when the two components are at their maximum separated position.

As the abrasive grit on surface 52 comes into contact with surface 42 of workpiece 40, as shown in FIG. 3, it should be apparent that the relative contacting orbital motion at the interface will cause the abrasive grit to abrade surface 42 and remove any passivation layer therefrom, so that the ECM reaction will proceed to machine surface 42 immediately after the passivation layer is removed, and for a period of time while tool 50 is spaced away therefrom as a result of the relative reciprocal movement. While surface 42 will start to become passivated thereafter, any surface oxidation that occurs will again be removed when the cycle is repeated, so that the electrochemical action can continue.

As before described, it will also be necessary to impose a feed motion to the reciprocating motion, so that with each cycle of reciprocation, the tool is brought down further than before so that it will continue to contact the workpiece surface 42, as that surface is progressively machined to a lower position.

As for the surface of the frusto-conical extension 44, it will be machined in substantially the same manner as was the cylindrical wall of workpiece 10, in the previously described embodiment, with some notable distinctions. That is to say, if the surface being machined is only a flat surface, such as surface 42, the reciprocating motion cannot adversely affect its being machined as above described. It should be noted, however, that the reciprocating movement can have a very significant effect on the machining action on surfaces that are not parallel to the contacting orbital motion, such as the sides of the frusto-conical extension 44. Specifically, if the contacting orbital and reciprocal motions are synchronized in a one to one relationship, it can be seen that only one side of the frusto-conical extension 44 will be machined, since the tool 50 will move downward contacting only a portion of the frusto-conical surface at the same place with each reciprocation movement, and then withdraw therefrom as the tool orbits to the other side. With a physical arrangement like this, therefore, in order to uniformly machine an entire circumferential surface when the tool is made to reciprocate therefrom, it is necessary that the contacting orbital motion and reciprocating motion be synchronized so that all portions of surface are contacted and abraded at least over a number of reciprocating cycles. The preferred approach to achieve this assurance, is to abrade various differing portions of the curved surface during successive contacting orbits so that the entire surface will be abraded within relatively few cycles of orbit. If passivation of the frusto-conical surface causes ECM machining thereof to be retarded, so that the ECM machining rate of the flat surface 42 proceeds at a much faster rate, it may be necessary to program the motion so that each pass of the abrasive tool over frusto-conical surface will necessarily affect a greater amount of mechanical abrading.

With further regard to the frusto-conical portion 44 of workpiece 40, it can be seen that the flat upper surface thereof would not be machined, as in the case of the top of cylindrical workpiece as described earlier. In this embodiment, however, the tool is progressively working its way downward, so that eventually, if machining is continued long enough, there would be contact at the upper flat surface thereof.

In contrast to the above described embodiment as illustrated in FIGS. 1 and 2, the contacting orbital motion in this embodiment will not cause the contacting surfaces 42 and 52 to reciprocate. This is because the plane of the contacting orbital motion is parallel to the plane being machined, at least with regard to surface 42. In this embodiment, therefore, it is necessary to impose a separate relative reciprocating movement for the purpose of pumping the electrolyte through the gap between surfaces 42 and 52 to prevent the electrolyte from becoming over-heated. It should become apparent, however, that if the plane of contacting orbital motion were not parallel to the surface being machined, but instead is inclined at an angle thereto, as depicted in FIG. 5, then the single relative contacting orbital motion would effect a reciprocating relative motion or displacement, so that the tool and workpiece would come into contact at the low point of the orbit, to effect the essential physical abrasion to remove the passivation layer, and thereafter orbit away from a contacting relationship to effectively pump the electrolyte as necessary to effect its circulation.

Figure 5:
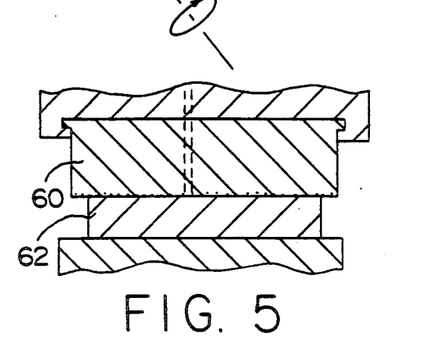
FIG. 5 is a schematic cross-sectional elevational view illustrating an embodiment of this invention for machining a flat surface utilizing an orbital motion inclined to the plane of the workpiece surface, showing the tool and workpiece in contact.
Figure 6:
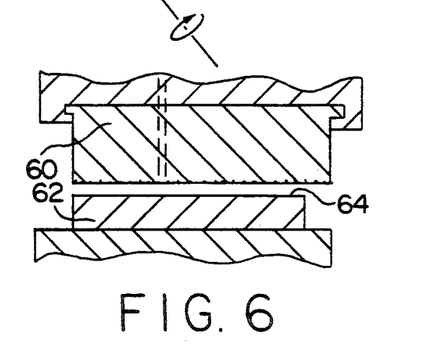
FIG. 6 is a schematic cross-sectional elevation the same as that of FIG. 5 but illustrating the tool rotated through one-half of cycle so that it is not in contact with the workpiece.

As shown in FIGS. 5 and 6, tool 60, having an axis of rotation as depicted thereabove, i.e. inclined at an angle to the surface to be machined, will come into contact with the upper surface of workpiece 62 at the furthest extent of downward-leftward orbital motion. Subsequently, as tool 60 orbits upward and to the right, it will move away from workpiece 62. Accordingly, a relative reciprocal motion will result from the contacting orbital motion. While the tool 60 will not be in contact with the workpiece 62 throughout the entire orbital motion, that makes little difference in this embodiment, as the entire surface 64 of workpiece 62 is in fact contacted and abraded by tool 60 while orbiting through its most downward position. In applications such as this, it is critically essential that the density of the abrasive grit on the tool surface be exceptionally high to assure that the entire workpiece surface is abraded during the quick pass-over by the tool.

As previously described, a means will have to be provided for feeding an electrolyte into the gap between tool 60 and workpiece 62, which will readily be pumped out of the interface by the reciprocating motion between tool 60 and workpiece 62. In this embodiment it can clearly be seen that the contacting orbital motion for abrading the surface of workpiece 62 as well as the reciprocating motion for pumping the electrolyte are effected by the one orbital motion, having an axis inclined to the surface of the workpiece. As in the case described for the embodiment of FIGS. 1 and 2, the orbital motion will have to be set to have a continually increasing radius of orbit in order to continue to maintain the essential contact as the surface of the workpiece is machined down, or in the alternative, a feeding motion can be imparted to a constant orbital motion to bring the tool and workpiece closer together as the workpiece is machined.

The above described embodiments have been limited to the machining of very simple surfaces merely for the purpose of describing the various forms of machining phenomenon that can be encountered in the practice of this invention. It should be apparent that those surfaces as described can be easily machined with other forms of conventional machining practices. Therefore, the process of this invention will find much better utility in the machining of more complex configurations which are not easily machined by other technique. For example, the machining of an image in a coin or die or other multifaceted surfaces are one type of example where this process would find particular utility, as well as the machining of complex three-dimensional and curved surfaces such as the surfaces of turbine blades and the like which are very difficult to machine by other processes, but can easily and very effectively be machined individually or in groups or even an entire arrangement thereof on a turbine wheel by the process of this invention.

Figure 7:
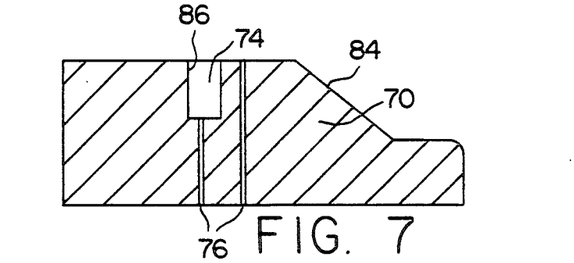
FIG. 7, is a schematic cross-sectional elevational view of a casting, on an unworked workpiece.
Figure 8:
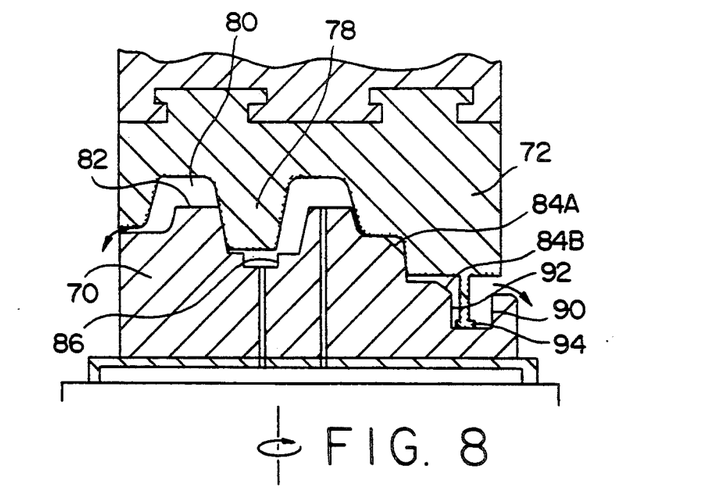
FIG. 8 is a schematic cross-sectional elevational view of the workpiece of FIG. 7 being machined in accordance with one embodiment of this invention to produce several faces therein.

Reference to FIGS. 7 and 8 will illustrate an example of the machining of a multifaceted workpiece, where FIG. 7 is a schematic cross-sectional view of the blank workpiece 70, while FIG. 8 illustrates the workpiece 70 and tool 72 in contact near the conclusion of the machining operation. As can be seen in FIG. 7, workpiece 70 has a nonuniform cross-section having a hole 74 in the upper surface. Two small narrow holes 76 are provided through the workpiece 70 for admitting the electrolyte during the ECM machining.

FIG. 8 schematically illustrates the machining of workpiece 70 in accordance with this invention, where tool 72 is made to orbitally contact the upper surface of workpiece 70 during the ECM machining process. In this embodiment, the axis of orbital rotation is perpendicular to the upper flat surface of the workpiece, so that there will be no reciprocal vertical displacement as a result of the contacting orbital motion. As can be seen in FIG. 8, a frusto-conical stem portion 78 on tool 70, extending vertically downward, will serve to machine out hole 74 providing it with a tapered side interior surface, at least to the extent machined. An annular space 80, surrounding stem 78 will serve to form an annular neck around hole 74. The upper flat surface 82 around hole 74, as well as the inclined surface 84 at points 84A and 84B, will not be machined as they are not contacted by tool 72, and will therefore be passivated by the electrolyte to be unaffected by the ECM reaction. To the extent that there are flat horizontal surfaces being machined in this application, it will be necessary to impose a relative reciprocal motion between workpiece 70 and tool 72 for the purpose of pumping electrolyte through any such horizontal interfaces, as previously described. As can be seen from this embodiment, the process can be used to machine a plurality of differing surfaces by utilizing a three-dimensional tool which is a negative complimentary image of the workpiece surfaces to be effected by the machining operation. The negative image imposed into the tool will have to be slightly undersized and oversized to compensate for the orbital displacement as the orbital path of the tool image will define the image machined.

It is appreciated that even in conventional ECM machining such workpieces are selectively deplated to form a negative, conjugate image of the tool face, as utilized in the above described embodiment of this invention, without any relative contacting orbital motion between the tool and workpiece. As previously noted, however, the prior art ECM procedures will always effect some degree of anticipated variation between the tool image and that machined into the workpiece because of process variables, such as electrolyte flow patterns and variables in conductivity across the gap, so that a trial and error approach is often utilized to develop a tool shape as necessary to achieve the desired machined shape. In the process of this invention, however, because the workpiece is passivated until such time as it is abraded by the tool surface, the process variables are significantly reduced so that the image created in the tool face, as corrected for its contacting orbital motion, is essentially the same as that machined into the workpiece, with little if any requirement for any trial and error testing. As an example thereof in the above described embodiment, those surfaces 82 and 84A and 84B, remaining untouched by the tool 72, will not at all be affected by the ECM reaction because of the macro controls afforded by this process. In conventional ECM processing, however, these surfaces would have some metal removed therefrom by the ECM reaction, regardless of the fact that the gap distance may be rather large, particularly as a result of stray etching in association with closely spaced tool surfaces in a different plane. For example, the cylindrical surface of hole 74 will be completely unaffected by this process, while in conventional ECM, at least the upper portions thereof would have some metal removed therefrom as the result of stray etching between that upper cylindrical surface 86 of hole 74 and the bottom surface of frusto-conical stem portion 78.

Another of the unique advantages of this invention is illustrated with reference to the machining of hole 90 i.e. surface 92. As is apparent from FIG. 1, hole 90 is entirely formed by the machining action of flange 94 on tool 72. As the hole depth is machined downward by the lower face of flange 94, the side of the hole, i.e. surface 92 is suitably machined and dressed by the side surfaces of flange 94 for a short time only. Once the flange 94 has progressed below any given point on the cylindrical side surface of hole 90 it has just formed, the abrasive action of flange 94 of course ceases, and that portion of surface 92 is quickly passivated by the electrolyte thereby preventing further electrochemical machining. Even though the gap between surface 92 and the side surface of stem above flange 94 opposed thereto may be ideal for ECM, the passivation layer on surface 92 will prevent any metal removal therefrom, thus preventing any overcutting as is otherwise common in conventional ECM.

Figure 9A:
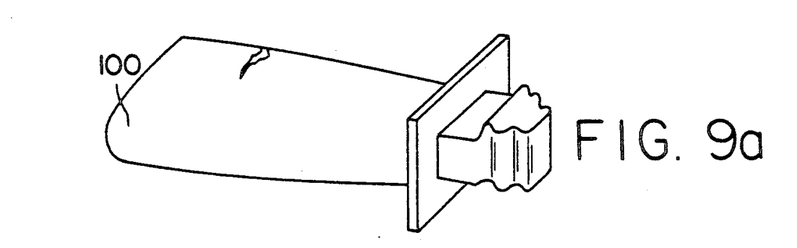
FIGS. 9a, 9b and 9c are isometric views of a turbine blade showing three stages in the process of repairing a crack therein.
Figures 9B, 9C:
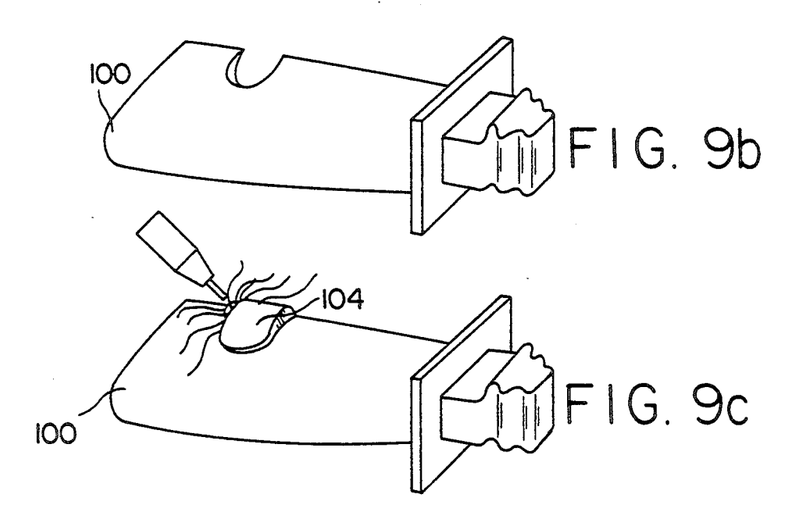

Reference to FIGS. 9a, 9b, 9c and 10 will illustrate still another embodiment of this invention which is utilized to machine a repaired metal part, such as a turbine blade as illustrated. For example, turbine blades having flaws therein, such as holes or cracks can be easily repaired by cutting out the flaw and depositing new metal in the cut-out area. This procedure is illustrated in FIGS. 9a, 9b and 9c. Here a crack in the turbine blade 100, as shown in FIG. 9a, is cut out by any suitable means, typically by conventional ECM or grinding. This renders the turbine blade with a cut-out as shown in FIG. 9b. Thereafter, new metal is deposited into the cut out portion by "dabber welding". To assure that the fill metal is as high as will be necessary for properly machining the turbine blade, it will of course be necessary to overfill the cut out as shown in FIG. 9c. Finally, the new metal should be machined down to recreate the original contour. Pursuant to prior art practices, this machining step is where the difficulty arose. For example, the contour sought to be machined in this particular application is not flat or circular, so that conventional machining could not be utilized. Conventional ECM has not be appropriate because overcutting would have some tendency to machine away a portion of the original turbine blade surface, so that the original contour could not be restored.

Figure 10:
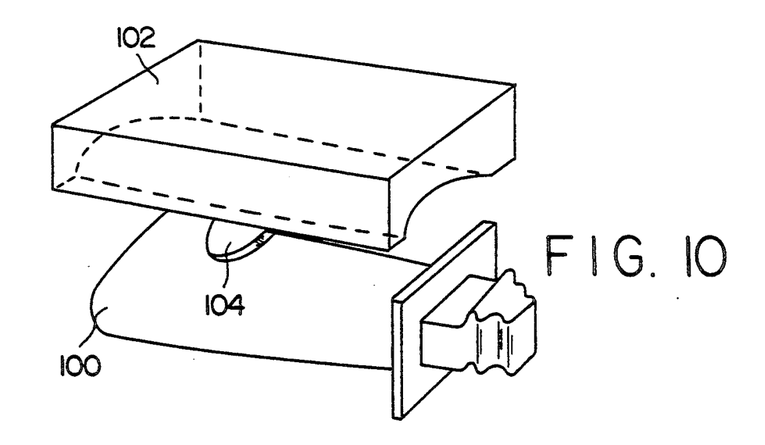
FIG. 10 is a schematic isometric view illustrating the application of the process of this invention in finishing the turbine blade illustrated in FIG. 9c.

The process of this invention, however, is ideally suited to the machining of such a repaired turbine blade, as schematically illustrated in FIG. 10. As generally shown in FIG. 10, and more specifically illustrated in FIG. 11, the partially repaired turbine blade 100 is made the anodic workpiece, while tool 102 is made cathodic in an orbital electrochemical machining process as taught herein. Pursuant to the above description, the strongly passivating electrolyte will passivate the entire surface of the turbine blade workpiece, including the new filled metal 104. In this application, however, the orbiting tool 102 will contact only the protruding filled metal 104, and accordingly, only that protruding filled metal 104 will be electrochemically machined pursuant to the principles described above. The original turbine metal, already having a contour as desired, will remain passivated throughout the entire operation, and will thus retain its original desired contour. In this application, however, where the contacting orbital motion of the tool 102 does not orbitally move away from the filler metal 104, it will be necessary to provide an oscillating, reciprocal movement between the tool 102 and the filler metal 104 for the purpose of increasing the circulation of electrolyte between the tool and workpiece to thus avoid over heating of the electrolyte. In this embodiment, the reciprocal motion will serve the added purpose of abrading both sides of the turbine blade.

Figure 11:
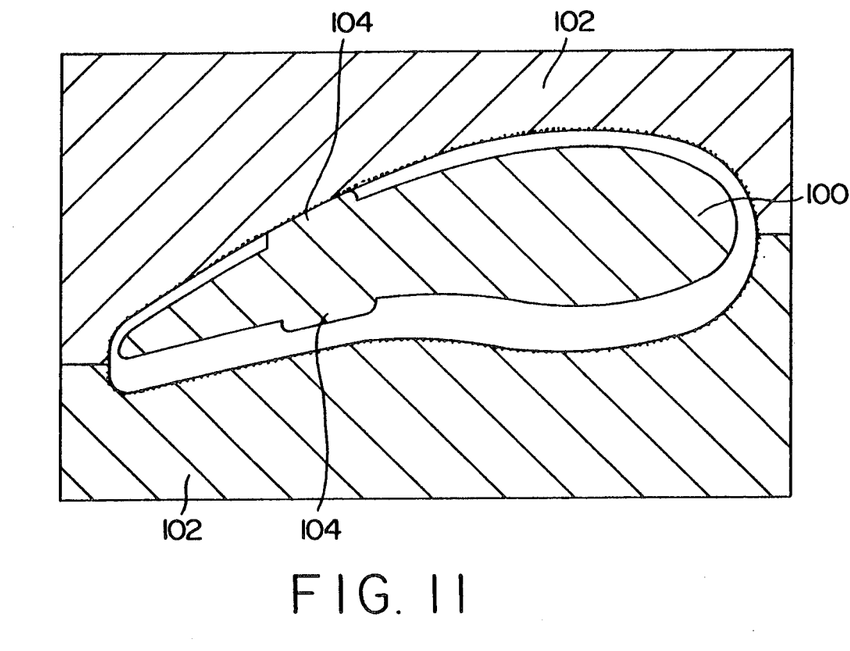
FIG. 11 is a cross-sectional end view of the tool and workpiece during the finishing operation schematically illustrated in FIG. 10.

In addition to repairing defective turbine blades having filler metal therein, the above described process can also be utilized to correct the contour of turbine blades, or any other such metal part which may be defective by virtue of the fact that the contour is not as exact as desired. Utilizing an application as illustrated in FIG. 11, the process of this invention can be utilized to abrade any high spots on the metal workpiece surface without adversely affecting those portions of the surface which do conform to the desired contour.

Figure 12:
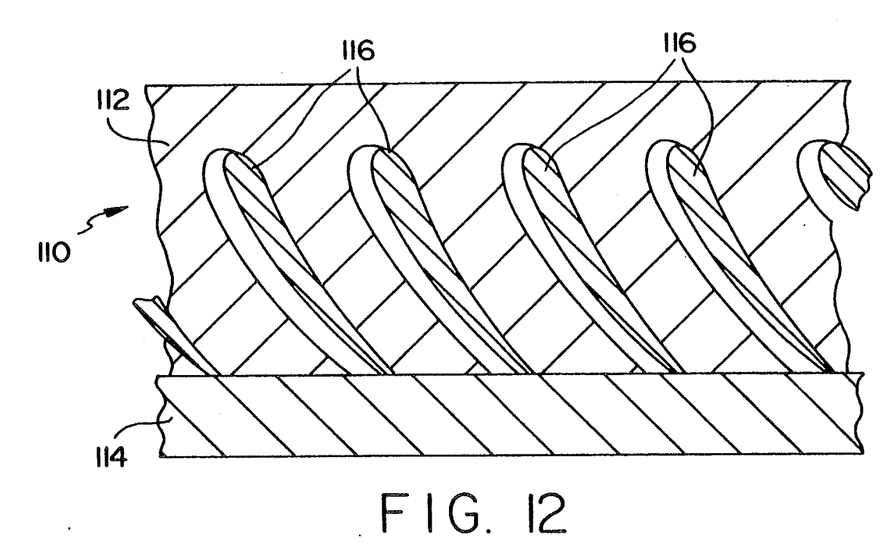
FIG. 12 is a schematic isometric view of a tool as placed on a turbine wheel to machining all of the turbine blades in a given circle of the turbine wheel.

Of significantly more importance, however, is the fact that the process of this invention can be utilized to simultaneously machine a group of turbine blades including a whole circle of turbine blades already affixed to a turbine wheel, whether mechanically attached thereto or formed as a one piece turbine wheel. As previously noted, the machining of the one piece turbine wheel has proven to be a very difficult operation. As schematically shown in FIG. 12, however, all the turbine blades on a turbine wheel can be machined simultaneously in an embodiment as shown, where the tool 110 comprises an upper portion 112 and lower portion 114, fitted together over a plurality of turbine blades 116. Utilizing the same principle as described above for abrading a single turbine blade, the plurality of turbine blades 114 can be abraded and machined simultaneously to effect exacting dimensions and contour to each of the turbine blades in one single operation.

In operation, an electrolyte should be selected which is strongly passivating to the workpiece metal, with the degree of passivation depending upon the nature of the machining to be performed, i.e. whether macro or micro controls are to be performed. In the embodiment illustrated in FIG. 1 for example, the passivating nature of the electrolyte serves only to effect a macro control of the electrochemical machining action, that is to completely prevent machining on certain selected surfaces. Therefore, the rate of passivation is not of any particular significance during the machining operation.

It should be noted that passivation is dependent upon many variables, namely, the electrolyte itself, the workpiece metal, the electrolyte pH, concentration and temperature, the voltage, and flow rate. Therefore, it is not possible to define a given electrolyte which will have suitable passivation characteristics for all applications. There are, however, references which describe and graph the passivating conditions of various electrolytes, so that depending upon the metal being machined and the nature of the machining action, a suitable electrolyte can be selected. For an example of such a reference, see *Practice and Theory of Electrochemical Machining* by John F. Wilson, Robert E. Krieger Publishing Co., Malabar, Fla., 1982; and *Electrochemical Machining* by J. A. McGeough, Halsted Press, 1974. If the workpiece were titanium, for example, a suitable electrolyte would be sodium nitrate, having a concentration of 1.6 lb/gal of $H_2O$, with a pH of 7.5 to 8.0, a voltage of 7 volts and a temperature of 85° F. Such an electrolyte under these conditions should quickly passivate the titanium metal surface, protecting it from the electrochemical machining action, except on those surfaces where the passivation layer is repeatedly being abraded away.

What is claimed is:

1. A method of machining a surface of an electrically conductive workpiece the steps comprising:
    a. forming a tool comprising an electrically conductive body with a surface of nonconductive abrasive particles complementary to said form to be machined;
    b. mounting said workpiece and said tool in an oscillating relationship to each other such that said nonconductive abrasive surface is opposed to said surface to be machined;
    c. connecting said tool and said workpiece to a DC power supply such that said tool is cathodic and said workpiece is anodic;
    d. introducing an electrolyte between said tool and said workpiece which is passivating to said workpiece to form a passivation layer thereon;
    e. causing a relative contacting motion between said tool and said workpiece such that said abrasive particles on the surface of said tool will abrade said workpiece only on those areas of the workpiece where machining is to be performed and thereby selectively abrade away only selected portions of said passivation layer on said workpiece to expose fresh workpiece metal thereunder, thereby permitting a portion of said workpiece metal to be removed by an electrochemical action of the electrolyte;
    f. causing a relative reciprocal motion between said tool and said workpiece sufficient to pump said electrolyte between said tool and said workpiece to prevent over-heating thereof;
    g. causing an advancing motion between said tool and said workpiece while said workpiece metal is being removed so as to maintain contact between said tool and said workpiece.

2. A method of claim 1 wherein said contacting relative motion is an orbital motion.

3. A method according to claim 2 wherein said relative orbital motion is in a plane sufficiently different from said surface to be machined that said relative orbital motion also effects said reciprocal motion.

4. A method according to claim 2 wherein said relative orbital motion is in a plane corresponding to said surface to be machined so that said reciprocal motion is independent of, and in a plane different than, said relative orbital motion.

5. A method according to claim 2 in which the orbital linear displacement between said tool and said workpiece is below about 0.100 inch.

6. A method according to claim 1 wherein said surface to be machined and said tool surface of nonconductive abrasive particles include curved surfaces.

7. A method according to claim 1 wherein said workpiece has at least two surfaces to be machined and said tool has at least two surfaces having abrasive particles so that all surfaces of said workpiece are machined simultaneously 8. A method according to claim 1 in which said workpiece is a turbine blade, and said tool has a form sufficient to fit around said turbine blade sufficient to machine multiple sides thereof.

9. A method according to claim 1 in which said workpiece is a turbine containing a plurality of turbine blades, and said tool has a form sufficient to fit around a plurality of said turbine blades and sufficient to machine multiple sides of said plurality of turbine blades.

10. A method according to claim 1 in which said orbital motion between said tool and said workpiece is from 10 to 12 feet per minute.

11. A method according to claim 1 in which said nonconductive abrasive particles have a grain size of less than 70 mesh.

12. A method of machining a surface of an electrically conductive workpiece the steps comprising:
    a. forming a tool comprising an electrically conductive body with a surface of nonconductive abrasive particles complementary to said form to be machined;
    b. mounting said workpiece and said tool in an oscillating relationship to each other such that said nonconductive abrasive surface is opposed to said surface to be machined;
    c. connecting said tool and said workpiece to a DC power supply such that said tool is cathodic and said workpiece is anodic;

d. introducing an electrolyte between said tool and said workpiece;

e. causing a relative contacting motion between said tool and said workpiece such that said abrasive particles on the surface of said tool will abrade away any passivation layer formed on said workpiece to expose fresh workpiece metal thereunder, thereby permitting said workpiece metal to be removed by an electrochemical action of the electrolyte;

f. causing a relative reciprocal motion between said tool and said workpiece sufficient to pump said electrolyte between said tool and said workpiece to prevent over-heating thereof;

g. causing an advancing motion between said tool and said workpiece while said workpiece metal is being removed so as to maintain contact between said tool and said workpiece during each abrading step.

13. A method of claim 12 wherein said relative contacting relative motion is an orbital motion.

14. A method according to claim 13 wherein said relative orbital motion is in a plane sufficiently different from said surface to be machined that said relative orbital motion also effects said reciprocal motion.

15. A method according to claim 13 wherein said relative orbital motion is in a plane corresponding to said surface to be machined and said reciprocal motion is independent of, and in a plane different than, said relative orbital motion.

16. A method according to claim 13 in which the orbital linear displacement between said tool and said workpiece is below about 0.100 inch.

17. A method according to claim 12 wherein said surface to be machined and said tool surface of nonconductive abrasive particles include curved surfaces.

18. A method according to claim 12 wherein said workpiece has at least two surfaces to be machined and said tool has at least two surfaces having abrasive particles so that all surfaces of said workpiece are machined simultaneously.

19. A method according to claim 12 in which said workpiece is a turbine blade, and said tool has a form sufficient to fit around said turbine blade sufficient to machine multiple sides thereof.

20. A method according to claim 12 in which said workpiece is a turbine containing a plurality of turbine blades, and said tool has a form sufficient to fit around a plurality of said turbine blades and sufficient to machine multiple sides of said plurality of turbine blades.

21. A method according to claim 12 in which said orbital motion between said tool and said workpiece is from 10 to 12 feet per minute.

22. A method according to claim 12 in which said nonconductive abrasive particles have a grain size of less than 70 mesh.

23. A method of machining a surface of an electrically conductive workpiece, the steps comprising:
  a. forming a tool comprising an electrically conductive body with a surface of nonconductive abrasive particles complementary to said form to be machined;
  b. mounting said workpiece and said tool in an oscillating relationship to each other such that said nonconductive abrasive surface is opposed to said surface to be machined;
  c. connecting said tool and said workpiece to a DC power supply such that said tool is cathodic and said workpiece is anodic;

d. introducing an electrolyte between said tool and said workpiece which is passivating to said workpiece to form a passivation layer thereon;

e. causing a relative orbital motion between said tool and said workpiece in a plane sufficiently different from said surface to be machined such that said relative orbital motion effects a relative reciprocal motion between said tool and said workpiece sufficient to pump said electrolyte between said tool and said workpiece to prevent over-heating thereof, said orbital motion causing said abrasive particles on the surface of said tool to abrade said workpiece only on those areas of the workpiece where machining is to be performed and thereby selectively abrade away only selected portions of said passivation layer on said workpiece to expose fresh workpiece metal thereunder, thereby permitting a portion of said workpiece metal to be removed by an electrochemical action of the electrolyte; and f. causing an advancing motion between said tool and said workpiece while said workpiece metal is being removed so as to maintain contact between said tool and said workpiece.

24. A method according to claim 23 wherein said relative orbital motion is in a plane corresponding to said surface to be machine so that said reciprocal motion is independent of, and in a plane different than, said relative orbital motion.

25. A method according to claim 23 in which the orbital linear displacement between said tool and said workpiece is below about 0.100 inch.

26. A method according to claim 23 wherein said surface to be machined and said tool surface of nonconductive abrasive particles include curved surfaces.

27. A method according to claim 23 wherein said workpiece has at least two surfaces to be machined and said tool has at least two surfaces having abrasive particles so that all surfaces of said workpiece are machined simultaneously.

28. A method according to claim 23 in which said workpiece is a turbine blade, and said tool has a form sufficient to fit around said turbine blade sufficient to machine multiple sides thereof.

29. A method according to claim 23 in which said workpiece is a turbine containing a plurality of turbine blades, and said tool has a form sufficient to fit around a plurality of said turbine blades and sufficient to machine multiple sides of said plurality of turbine blades.

30. A method according to claim 23 in which said orbital motion between said tool and said workpiece is from 10 to 12 feet per minute.

31. A method according to claim 23 in which said nonconductive abrasive particles have a grain size of less than 70 mesh.

32. A method of machining a surface of an electrically conductive workpiece, the steps comprising:
  a. forming a tool comprising an electrically conductive body with a surface of nonconductive abrasive particles complementary to said form to be machined;
  b. mounting said workpiece and said tool in an oscillating relationship to each other such that said nonconductive abrasive surface is opposed to said surface to be machined.
  c. connecting said tool and said workpiece to a DC power supply such that said tool is cathodic and said workpiece is anodic;

d. introducing an electrolyte between said tool and said workpiece;

e. causing a relative orbital motion between said tool and said workpiece in a plane sufficiently different from said surface to be machined such that said relative orbital motion effects a relative reciprocal motion between said tool and said workpiece sufficient to pump said electrolyte between said tool and said workpiece to prevent over-heating thereof, said orbital motion causing said abrasive particles on the surface of said tool to abrade away any passivation layer formed on said workpiece to expose fresh workpiece metal thereunder, thereby permitting said workpiece metal to be removed by an electrochemical action of the electrolyte; and f. causing an advancing motion between said tool and said workpiece while said workpiece metal is being removed so as to maintain contact between said tool and said workpiece during each abrading step.

33. A method according to claim 32 wherein said relative orbital motion is in a plane corresponding to said surface to be machined and said reciprocal motion is independent of, and in a plane different than, said relative orbital motion.

34. A method according to claim 32 in which the orbital linear displacement between said tool and said workpiece is below about 0.100 inch.

35. A method according to claim 32 wherein said surface to be machined and said tool surface of nonconductive abrasive particles include curved surfaces.

36. A method according to claim 32 wherein said workpiece has at least two surfaces to be machined and said tool has at least two surfaces having abrasive particles so that all surfaces of said workpiece are machined simultaneously.

37. A method according to claim 32 in which said workpiece is a turbine blade, and said tool has a form sufficient to fit around said turbine blade sufficient to machine multiple sides thereof.

38. A method according to claim 32 in which said workpiece is turbine containing a plurality of turbine blades, and said tool has a form sufficient to fit around a plurality of said turbine blades and sufficient to machine multiple sides of said plurality of turbine blades.

39. A method according to claim 32 in which said orbital motion between said tool and said workpiece is from 10 to 12 feet per minute.

40. A method according to claim 32 in which said nonconductive abrasive particles have a grain size of less than 70 mesh.

* * * * *